Patented Dec. 9, 1941

2,265,183

UNITED STATES PATENT OFFICE 2,265,183

ESTERS OF DESOXYCORTICOSTERONE AND PROCESS OF PREPARING SAME

Karl Miescher, Riehen, and Werner Fischer, Basel, Switzerland, assignors, by mesne assignments, to Ciba Pharmaceutical Products, Incorporated, Summit, N. J., a corporation of New Jersey No Drawing. Application June 20, 1939, Serial No. 280,212. In Switzerland June 27, 1938

4 Claims. (Cl. 260—397.4)

This invention relates to the manufacture of new esters of desoxycorticosterone by treating desoxycorticosterone, or an ester thereof derived from an inorganic acid, with an acylating agent which is adapted for introducing an acyl residue having more than two carbon atoms.

Suitable acylating agents are, for example, aliphatic, aromatic or hydroaromatic mono- or polycarboxylic acids or their anhydrides, halides, esters derived from alcohols of low molecular weight (re-esterification) or their salts, also the corresponding ketenes. The acid residue may be of straight chain or branched chain and saturated or unsaturated. Thus there may be used halides, anhydrides or salts or propionic acid, butyric acids, valerianic acids, caproic acids, capric acid, crotonic acid, phenylacetic acid, lactic acid, alkylcarbonic acids or alkyloxyacetic acid. Also those of succinic acid, phthalic acid or the like.

The new esters have an especially favorable physiological effect. They are active in the survival test, i. e. they have a life preserving effect which is more protracted than that of the compounds known at the time of filing the present application. The new esters are applicable in therapeutics.

The following examples illustrate the invention, the parts being by weight:

Example 1

0.5 part of desoxycorticosterone is mixed with 2.5 parts of pyridine at room temperature and 1 part of propionic anhydride, and the mixture is allowed to stand for several hours. It is then diluted with water until crystallization begins; the product is washed on the filter with water and strongly diluted hydrochloric acid, and purified by recrystallization from a mixture of acetone and petroleum ether. There is obtained 0.55 part of desoxycorticosterone propionate which melts at 163–164° C. and has a specific rotation of $[\alpha]^{25}_D + 186°$ (in chloroform).

Instead of propionic anhydride propionyl chloride may be used as the propionating agent.

The same products are obtained by heating 21-chloropregnene-dione-(3:20) with sodium propionate in an alcoholic solution until separation of sodium chloride ceases.

Example 2

To a solution of 0.5 part of desoxycorticosterone in 2.5 parts of pyridine there is added 1 part of n-butyric anhydride. The mixture is allowed to stand for several hours at room temperature. The product is precipitated by addition of water at first in an oily condition, but soon crystallizing; it is washed with water and strongly diluted hydrochloric acid on the filter. In this manner 0.56 part of desoxycorticosterone-n-butyrate is obtained which, after recrystallization from a mixture of acetone and petroleum ether melts at 110–111° C. and has a specific rotation of $$[\alpha]^{21}_D + 177°$$

(in chloroform).

The reaction may be also conducted without the use of an acid binding agent or instead of the acid anhydride the n-butyric acid chloride may be used.

In analogous manner the isobutyrate of desoxycorticosterone may be made.

Example 3

By the methods described in the above examples 0.58 part of desoxycorticosterone-n-valerianate may be made from 0.5 part of desoxycorticosterone and 1 part of n-valerianic acid anhydride in 2.5 parts of pyridine. This ester melts after recrystallization from a mixture of acetone and petroleum ether at 84–85° C. and has a specific rotation of $[\alpha]^{21}_D + 175°$ (in chloroform).

In analogous manner are obtained the isovalerianate, the capronates, the heptanoates, the octanoates, the pelargonic acid ester, the caprinate of desoxycorticosterone.

Example 4

To a solution cooled by a cooling mixture of 0.5 part of desoxycorticosterone and 5 parts of pyridine is added by drops 1 part of palmitic acid chloride, and the mixture is allowed to stand for several hours at room temperature. The whole is mixed with water, and the product of reaction extracted with ether. The ethereal solution is shaken successively with dilute hydrochloric acid, dilute sodium carbonate solution, dilute caustic soda solution and water, and then dried over sodium sulfate. The palmitate of desoxycorticosterone obtained by evaporating the solvent is recrystallized from petroleum ether and then has a melting point of 60–61° C. and a specific rotation $[\alpha]^{21}_D + 128°$ (in chloroform).

In analogous manner the crotonate, the oleate, the laurate, the myristic acid ester and other esters of desoxycorticosterone are obtained.

Example 5

1 part of benzoyl chloride is added by drops while cooling to a solution of 0.5 part of desoxycorticosterone in 5 parts of pyridine. The mixture is allowed to stand for several hours and the product precipitated by the addition of a little water. 0.65 part of desoxycorticosterone benzoate is thus obtained which, after recrystallization from acetone melts at 209–210° C., has a specific rotation of $[\alpha]^{21}_D +202°$.

*Example 6*

To a solution, cooled by a cooling mixture, of 0.5 part of desoxycorticosterone and 5 parts of pyridine is added by drops 1 part of stearine acid chloride, and the mixture is allowed to stand for several hours at room temperature. The whole is mixed with water, and the product of reaction extracted with ether. The ethereal solution is shaken successively with dilute hydrochloric acid, dilute sodium carbonate solution, dilute caustic soda solution and water, and then dried over sodium sulfate. The stearate of desoxycorticosterone obtained by evaporating the solvent is recrystallized from petroleum ether and then has a melting point of 63–64° C. and a specific rotation $[\alpha]^{21}_D +116°$ (in chloroform).

What we claim is:

1. Process for the manufacture of new esters of desoxycorticosterone, comprising treating a member of the group consisting of desoxycorticosterone and an inorganic ester thereof with an acylating agent the acid radical of which contains more than two carbon atoms.

2. Process for the manufacture of a new ester of desoxycorticosterone, comprising treating desoxycorticosterone with a palmitylating agent.

3. The desoxycorticosterone esters the acid radical of which contains more than two carbon atoms.

4. The desoxycorticosterone palmitate of melting point 60–61° C.

KARL MIESCHER.
WERNER FISCHER.